United States Patent
He

(10) Patent No.: US 10,595,198 B2
(45) Date of Patent: *Mar. 17, 2020

(54) COMMUNICATION METHOD AND DEVICE

(71) Applicant: HUAWEI TECHNOLOGIES CO., LTD., Shenzhen, Guangdong (CN)

(72) Inventor: Chengdong He, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/023,324

(22) Filed: Jun. 29, 2018

(65) Prior Publication Data

US 2018/0310170 A1    Oct. 25, 2018

Related U.S. Application Data

(63) Continuation of application No. 15/372,093, filed on Dec. 7, 2016, now Pat. No. 10,015,669, which is a
(Continued)

(30) Foreign Application Priority Data

Aug. 31, 2007 (CN) .......................... 2007 1 0145703
Sep. 26, 2007 (CN) .......................... 2007 1 0151700

(51) Int. Cl.
  *H04L 29/06* (2006.01)
  *H04W 12/04* (2009.01)
  (Continued)

(52) U.S. Cl.
  CPC .............. *H04W 12/04* (2013.01); *H04L 9/088* (2013.01); *H04L 9/0844* (2013.01);
  (Continued)

(58) Field of Classification Search
  None
  See application file for complete search history.

(56) References Cited

U.S. PATENT DOCUMENTS 6,028,933 A    2/2000  Heer et al.
6,671,507 B1  12/2003  Vinck
(Continued)

FOREIGN PATENT DOCUMENTS

CN    1455556 A    11/2003
CN    1589060 A     3/2005
(Continued)

OTHER PUBLICATIONS

Vales-Alonso, J. et al. Selective interceptors for the UMTS Terrestrial Radio Access Network. IEEE 60th Vehicular Technology Conference, 2004. VTC2004-Fall. https://ieeexplore.ieee.org/stamp/stamp.jsp?tp=&arnumber=1405106 (Year: 2004).*
(Continued)

*Primary Examiner* — Jeremiah L Avery
(74) *Attorney, Agent, or Firm* — Slater Matsil, LLP

(57) ABSTRACT

A communication method includes receiving by a SGSN a context request message from a mobility management entity (MME), obtaining by the SGSN an authentication vector-related key, and calculating by the SGSN a root key according to the authentication vector-related key. In addition, the method further includes sending by the SGSN a context response message including the root key to the MME, wherein the MME derives a NAS protection key according to the root key.

20 Claims, 4 Drawing Sheets

Related U.S. Application Data continuation of application No. 14/873,504, filed on Oct. 2, 2015, now Pat. No. 9,538,373, which is a continuation of application No. 14/303,146, filed on Jun. 12, 2014, now Pat. No. 9,241,261, which is a continuation of application No. 14/147,179, filed on Jan. 3, 2014, now Pat. No. 8,812,848, which is a continuation of application No. 12/633,948, filed on Dec. 9, 2009, now Pat. No. 8,656,169, which is a continuation of application No. PCT/CN2008/072165, filed on Aug. 27, 2008.

(51) Int. Cl.
*H04L 9/08* (2006.01)
*H04W 36/00* (2009.01)
*H04W 12/10* (2009.01)
*H04W 8/02* (2009.01)
*H04W 12/12* (2009.01)

(52) U.S. Cl.
CPC ........ *H04L 63/0492* (2013.01); *H04L 63/062* (2013.01); *H04L 63/0876* (2013.01); *H04L 63/1441* (2013.01); *H04L 63/20* (2013.01); *H04L 63/205* (2013.01); *H04L 69/24* (2013.01); *H04W 8/02* (2013.01); *H04W 12/10* (2013.01); *H04W 36/0038* (2013.01); *H04L 2463/061* (2013.01); *H04W 12/12* (2013.01)

(56) References Cited

U.S. PATENT DOCUMENTS

| | | | |
|---|---|---|---|
| 7,190,793 B2 | 3/2007 | Hsu | |
| 7,310,307 B1* | 12/2007 | Das | H04L 12/66 370/229 |
| 7,911,943 B2 | 3/2011 | Rasanen et al. | |
| 7,929,703 B2 | 4/2011 | Bellows et al. | |
| 7,962,122 B2 | 6/2011 | Nikander et al. | |
| 8,027,304 B2 | 9/2011 | Forsberg | |
| 8,078,753 B2 | 12/2011 | Bachmann et al. | |
| 8,107,433 B2 | 1/2012 | Jokinen | |
| 8,117,454 B2 | 2/2012 | Forsberg | |
| 8,165,054 B2 | 4/2012 | Becker et al. | |
| 8,170,566 B2 | 5/2012 | Pudney | |
| 8,213,903 B2 | 7/2012 | Pudney et al. | |
| 8,295,243 B2 | 10/2012 | Malladi et al. | |
| 8,462,742 B2 | 6/2013 | Song et al. | |
| 8,515,462 B2 | 8/2013 | Courau et al. | |
| 8,627,092 B2 | 1/2014 | Fischer et al. | |
| 8,682,357 B2 | 3/2014 | Worrall | |
| 8,761,091 B2 | 6/2014 | Zisimopoulos et al. | |
| 8,812,848 B2 | 8/2014 | He | |
| 2002/0052200 A1 | 5/2002 | Arkko et al. | |
| 2002/0066011 A1 | 5/2002 | Vialen et al. | |
| 2002/0071558 A1* | 6/2002 | Patel | H04W 12/04 380/270 |
| 2003/0139180 A1* | 7/2003 | McIntosh | H04L 63/0853 455/426.1 |
| 2005/0147249 A1 | 7/2005 | Gustavsson et al. | |
| 2006/0182280 A1* | 8/2006 | Laitinen | H04L 63/06 380/247 |
| 2007/0041360 A1 | 2/2007 | Gallagher et al. | |
| 2007/0086591 A1* | 4/2007 | Blom | H04L 63/0435 380/279 |
| 2007/0117563 A1 | 5/2007 | Terry et al. | |
| 2007/0117575 A1 | 5/2007 | Courau et al. | |
| 2007/0153739 A1 | 7/2007 | Zheng | |
| 2007/0186000 A1 | 8/2007 | Nikander et al. | |
| 2007/0204160 A1 | 8/2007 | Chan et al. | |
| 2007/0210894 A1 | 9/2007 | Park et al. | |
| 2007/0218903 A1* | 9/2007 | Grech | H04W 36/02 455/436 |
| 2007/0224993 A1* | 9/2007 | Forsberg | H04L 9/0844 455/436 |
| 2007/0248064 A1 | 10/2007 | Shaheen | |
| 2007/0249352 A1* | 10/2007 | Song | H04L 63/08 455/436 |
| 2007/0271458 A1* | 11/2007 | Bosch | H04L 63/0853 713/168 |
| 2007/0297367 A1* | 12/2007 | Wang | H04L 63/0414 370/331 |
| 2008/0020745 A1* | 1/2008 | Bae | H04W 60/04 455/422.1 |
| 2008/0025263 A1 | 1/2008 | Pelkonen | |
| 2008/0031159 A1* | 2/2008 | Jokinen | H04W 36/0033 370/255 |
| 2008/0045262 A1 | 2/2008 | Phan et al. | |
| 2008/0102896 A1 | 5/2008 | Wang et al. | |
| 2008/0184032 A1 | 7/2008 | Li et al. | |
| 2008/0188200 A1 | 8/2008 | Forsberg | |
| 2008/0207168 A1 | 8/2008 | Forsberg | |
| 2008/0301434 A1 | 12/2008 | Haddad et al. | |
| 2009/0016334 A1 | 1/2009 | Forsberg et al. | |
| 2009/0025060 A1 | 1/2009 | Mukherjee et al. | |
| 2009/0046674 A1 | 2/2009 | Gao et al. | |
| 2009/0067628 A1 | 3/2009 | Pudney et al. | |
| 2009/0221306 A1 | 9/2009 | Jacobsohn et al. | |
| 2009/0275309 A1 | 11/2009 | He | |
| 2010/0235634 A1 | 9/2010 | Fischer | |
| 2014/0169563 A1 | 6/2014 | Yan | |

FOREIGN PATENT DOCUMENTS

| | | |
|---|---|---|
| CN | 1710985 A | 12/2005 |
| CN | 1795656 A | 6/2006 |
| CN | 1801698 A | 7/2006 |
| CN | 1937487 A | 3/2007 |
| CN | 1953374 A | 4/2007 |
| CN | 1983921 A | 6/2007 |
| CN | 101242630 A | 8/2008 |
| CN | 101309500 A | 11/2008 |
| EP | 1282321 B1 | 2/2003 |
| EP | 2214444 A1 | 8/2010 |
| JP | 2009531952 A | 9/2009 |
| JP | 2009540721 A | 11/2009 |
| JP | 2010521905 A | 6/2010 |
| JP | 2010528559 A | 8/2010 |
| RU | 2174924 C1 | 10/2001 |
| WO | 2007078159 A1 | 7/2007 |

OTHER PUBLICATIONS

Xenakis, Christos et al. A Secure Mobile VPN Scheme for UMTS. 12th European Wireless Conference 2006—Enabling Technologies for Wireless Multimedia Communications. https://ieeexplore.ieee.org/stamp/stamp.jsp?tp=&arnumber=5758225 (Year: 2006).*

3GPP TS 23.401 V1.1.0 (Jul. 2007),3rd Generation Partnership Project;Technical Specification Group Services and System Aspects;GPRS enhancements for E-UTRAN access(Release 8),total 77 pages.

3GPP TR 23.882 V1.11.0 (Jul. 2007),3rd Generation Partnership Project;Technical Specification Group Services and System Aspects;3GPP System Architecture Evolution:Report on Technical Options and Conclusions(Release 7),total 211 pages.

3GPP TR 33.821 V0.4.0 (Jul. 2007),3rd Generation Partnership Project;Technical Specification Group Services and System Aspects;Rationale and track of security decisions in Long Term Evolved (LTE) RAN / 3GPP System Architecture Evolution (SAE) (Release 8),total 88 pages.

S3-070529 Nokia et al.,"Pseudo-CR to TR 33.821: Key handling on idle mode mobility",3GPP TSG SA WG3 Security—S3#48,10—Jul. 13, 2007,Montreal, Canada,total 3 pages.

S3-070685 Huawei,"Key handling on idle mode mobility from UTRAN to E-UTRAN",3GPP TSG SA WG3 Security—S3#49,8—Oct. 12, 2007,Munich, Germany,total 2 pages.

(56) References Cited

OTHER PUBLICATIONS

3GPP TR 33.821 V0.2.0 (Apr. 2007),3rd Generation Partnership Project;Technical Specification Group Services and System Aspects;Rationale and track of security decisions in Long Term Evolved (LTE) RAN / 3GPP System Architecture Evolution (SAE) (Release 8),total 78 pages.
A.R. Prasad et al.,"An Evolutionary Approach towards Ubiquitous Communications:A Security Perspective", Proceedings of the 2004 International Symposium on Applications and the Internet Workshops (SAINTW'04),total 7 pages.
Rajavelsamy R et al.,"A Novel Method for Authentication Optimization during Handover in Heterogeneous Wireless Networks",2007 IEEE,total 5 pages.
Victor Y.H. Kueh et al.,"Application of Context Transfer for Roaming in IP-Based Evolved 3G Networks",The 17th Annual IEEE International Symposium on Personal, Indoor and Mobile Radio Communications (PIMRC'06),total 5 pages.
S. Sargento et al.,"Ubiquitous Access through the Integration of Mobile Ad-hoc Networks",Mobile & Wireless Communications Summit , 2007,total 6 pages.
Kyung-Ho Kim,"Key Technologies for the Next Generation Wireless Communications",International Conference on Hardware/software Cod,2006,total 4 pages.
VC Joseph et al., "Verifiable AKA for Beyond 3G Wireless Packet Services",2006 IFIP International Conference on Wireless and Optical Communications Networks,total 5 pages.
T Chiba et al.,"Mobility Management Schemes for Heterogeneity Support in Next Generation Wireless Networks",3rd EuroNGI Conference on Next Generation Internet Networks. Pub: 2007,,total 8 pages.
A Udugama et al.,"NetCAPE: Enabling Seamless IMS Service Delivery across Heterogeneous Mobile Networks", <<IEEE Communications Magazine>> , 2007,total 8 pages.
YY Chan et al.,"Security for Emerging Ubiquitous Networks",IEEE Vehicular Technology Conference , 2005,total 7 pages.
Niranjan et al.,"Adaptive Link Layer Security for Wireless Networks (ALL-SEC)",MILCOM 2004—2004 iEEE Military Communications Conference,total 7 pages.
M Inoue et al.,"Development of MIRAI System for Heterogeneous Wireless Networks",IEEE International Symposium on Personal , 2002,total 5 pages.
M Khatib et al.,"G-OPEP: An On-Demand Group Key Agreement Protocol for MANETs",Mobile Computing & Wireless Communication International Conference,2007,total 6 pages.
F Li et al.,"Mobility Reduces Uncertainty in MANETs",26th IEEE International Conference on Computer Communications,total 9 pages.
A Jehangir et al.,"Securing inter-cluster communication in Personal Networks",Fourth Annual International Conference on Mobile and Ubiquitous Systems:Networking&Services, 2007. Pub. Date: 2007,total 6 pages.
H Chaouchi et al.,"Policy Based Networking in the Integration Effort of 4G Networks and Services",2004 IEEE 59th Vehicular Technology Conference. Pub. Date: 2004,total 5 pages.
S. Subenthiran et al.,"Requirements for Identity Management in Next Generation Networks",The 6th International Conference on Advanced Communication Technology, 2004,total 5 pages.
P. Traynor et al.,"Establishing Pair-wise Keys in Heterogeneous Sensor Networks",Proceedings IEEE INFOCOM 2006. 25th IEEE International Conference on Computer Communications,total 12 pages.
Lei Zhang et al.,"A Generic Communication Architecture for End to End Mobility Management in the Internet",The 2nd International Conference on Wireless Broadband and Ultra Wideband Communications (AusWireless 2007),total 9 pages.
P. Bellavista et al."Context-Aware Middleware for Resource Management in the Wireless Internet", <<IEEE Transactions on Software Engineering>> ,2003,total 14 pages.

Thomas Kostas et al.,"Key management for secure multicast group communication in mobile networks",Proceedings DARPA Information Survivability Conference and Exposition,Apr. 22-24, 2003,total 3 pages.
3GPP TS 33.102 V7.1.0 (Feb. 2006),3rd Generation Partnership Project;Technical Specification Group Services and System Aspects;3G Security;Security architecture(Release 7),total 70 pages.
Heikki Kaaranen et al.,"UMTS Networks: Architecture, Mobility and Services, Second Edition",John Wiley and Sons, Inc. , Sep. 2001,total 413 pages.
Warwick Ford et al.,"Secure Electronic Commerce: Building the Infrastructure for Digital Signatures and Encryption-second Edition",total 19 pages.
TSGR3#7(99)D49 Ericsson,"Proposed liaison statement to SA3,CN1,RAN2",TSG-RAN Working Group 3 meeting #7, Sophia Antipolis, France, Sep. 20-24, 1999,total 9 pages.
S Sargento et al.,"Ubiquitous Access through the Integration of Mobile Ad-hoc Networks",Mobile and Wireless Communications Summit , 2007,total 6 pages.
Valtteri Niemi et al.,"Universal Mobile Telecommunications System(UMTS) Secureity",John Wiley and Sons, Inc. ,2003,total 57 pages.
S3-070100 Nokia et al.,"Security algorithm negotiation in SAE/LTE networks",3GPP TSG SA WG3 Security—SA3#46,Beijing, China, Feb. 13-16, 2007 ,total 10 pages.
S3-070529 Nokia et al.,"Pseudo-CR to TR 33.821: Key handling on idle mode mobility",3GPP TSG SA WG3 Security—S3#48,Jul. 10-13, 2007,Montreal, Canada,total 3 pages.
TSGR3#7(99)B55 Ericsson,"Security Mode Control Procedure for RANAP",TSG-RAN Working Group 3 meeting #7, Sophia Antipolis, France, Sep. 20-24, 1999,total 8 pages.
S2-073568 Nokia et al.,"Establishment of NAS security",3GPP TSG SA WG2 Meeting #59,Aug. 27-31, 2007, Helsinki, Finland,total 8 pages.
S3-070365 Huawei,"Pseudo-Change to TR 33.821: Update of section 7.4.13.4.4 Algorithms selection on handover to and from 2G/3G",3GPP TSG SA WG3 Security—S3#47,May 22-25, 2007,Tallinn, Estonia,total 2 pages.
S3-070366 Huawei,"Key conversion and key transfer for inter-RAT handover",3GPP TSG SA WG3 Security—S3#47,May 22-25, 2007,Tallinn, Estonia,total 3 pages.
S3-070522 Nokia et al.,"Update on algorithms selection",3GPP TSG SA WG3 Security—SA3#48,Montreal, Jul. 10-13, 2007,total 6 pages.
S2-072966 Ericsson,"Tracking Area Update GERAN-E-UTRAN",3GPP TSG SA WG2 Architecture—S2#58,Jun. 25-29, 2007,Orlando, USA,total 6 pages.
S2-072967 Ericsson,"Tracking Area Update UMTS—E-UTRAN",3GPP TSG SA WG2 Architecture—S2#58,Jun. 25-29, 2007,Orlando, USA,total 7 pages.
S2-073102 Ericsson,"Tracking Area Update GERAN—E-UTRAN",3GPP TSG SA WG2 Architecture—S2#58,Jun. 25-29, 2007,Orlando, USA,total 6 pages.
S2-073103 Ericsson,"Tracking Area Update UMTS—E-UTRAN",3GPP TSG SA WG2 Architecture—S2#58,Jun. 25-29, 2007,Orlando, USA,total 7 pages.
S3-070304 Nokia et al.,"Key handling on idle mode mobility",3GPP TSG SA WG3 Security—SA3#47,Tallinn, Estonia, May 22-25, 2007,total 2 pages.
3GPP TS 23.401 V1.1.0 (Jul. 2007),3rd Generation Partnership Project;Technical Specification Group Services and System Aspects;GPRS enhancements for E-UTRAN access(Release 8),total 78 pages.
S3-070478 3GPP TR 33.821 V0.3.0 (May 2007),3rd Generation Partnership Project;Technical Specification Group Services and System Aspects; Rationale and track of security decisions in Long Term Evolved (LTE) RAN / 3GPP SystemArchitecture Evolution (SAE) (Release 8),total 84 pages.
027_SAMSUNG-HNDCA-000013919_image File History of U.S. Appl. No. 60/852,967, filed Oct. 20, 2006, 37 pages,total 37 pages.
028_Samsung-HNDCA-000013956_image File History of U.S. Appl. No. 60/950,486, filed Jul. 18, 2007, 57 pages,total 57 pages.

(56) References Cited

OTHER PUBLICATIONS

119_Samsung-HNDCA-000015336_S2-061140 Samsung Electronics.,"Generic approach: Idle state mobility between 3GPP Access systems",3GPP TSG SA WG2 Architecture—S2#51,Feb. 13-17, 2006,Denver, Colorado, USA,total 4 pages.
NSN261-1001 U.S. Pat. No. 9,241,261,total 13 pages.
NSN261-1005 3GPP TS 23.401 V1.1.1 (Jul. 2007), 3rd Generation Partnership Project; Technical Specification Group Services and System Aspects; GPRS enhancements for E-UTRAN access (Release 8),total 78 pages.
NSN261-1006 3GPP TR 33.821 V0.4.0(Jul. 2007), 3rd Generation Partnership Project;Technical Specification Group Services andSystem Aspects; Rationale and track of security decisions in Long Term Evolved (LTE) RAN /3GPP System Architecture Evolution (SAE) (Release 8),total 88 pages.
NSN261-1007 3GPP TS 23.060 V7.4.0 (Mar. 2007), 3rd Generation Partnership Project; Technical Specification Group Services and System Aspects; General Packet Radio Service (GPRS);Service description; Stage 2 (Release 7),total 216 pages.
NSN261-1008 Song U.S. Pat. No. 8,462,742,total 30 pages.
NSN261-1009 3GPP TS 23.401 V8.4.0 (Dec. 2008), 3rd Generation Partnership Project; Technical Specification Group Services and System Aspects; GPRS enhancements for E-UTRAN access (Release 8),total 219 pages.
NSN261-1010 3GPP TR 21.905 V7.0.0 (Sep. 2005), 3rd Generation Partnership Project; TechnicalSpecification Group Services and System Aspects; Vocabulary for 3GPP Specifications (Release 7),total 55 pages.
NSN261-1011 3GPP TS 33.102 V7.1.0 (Dec. 2006), 3rd Generation Partnership Project; Technical Specification Group Services and System Aspects; 3G Security; Security architecture (Release 7),total 64 pages.
NSN261-1012 3GPP TS 33.401 V2.0.0 (May 2008), 3rd Generation Partnership Project; Technical Specification Group Services and System Aspects; 3GPP System Architecture Evolution (SAE): Security Architecture; (Release 8),total 45 pages.
NSN261-1013 TSGS#34(06)060926 Motorola et al.,"Updated WID: 3GPP System Architecture Evolution Specification(SAES)",Technical Specification Group Services and System Aspects,Meeting #34, Dec. 4-7, 2006,Budapest, Hungary,total 4 pages.
NSN261-1015 Forsberg, Dan et al., "LTE Security," 2nd Edition, (John Wiley and Sons Ltd. 2013).,total 11 pages.
NSN261-1023 TSGS#39(08)0132 SP-080132, 3GPP TSG SA—SP#39, Mar. 10-13, 2008, Updated WID: 3GPP System Architecture Evolution Specification (SAES),available at http://www.3gpp.org/ftp/tsg_sa/TSG_SA/TSGS_39/Docs/ (Timestamp Mar 5, 2008),total 5 pages.
NSN261-1024 3GPP TR 25.931 V8.0.0 (Dec. 2008), 3rd Generation Partnership Project; TechnicalSpecification Radio Access Network; UTRAN functions, examples on signalling procedures (Release 8),total 130 pages.
NSN261-1025 3GPP TR 24.301 V8.0.0 (Dec. 2008), 3rd Generation Partnership Project; TechnicalSpecification Group Core Network and Terminals; Non-Access Stratum (NAS) protocol for Evolved Packet System (EPS); Stage 3 (Release 8),total 221 pages.
NSN261-1050 3GPP TR 21.900 V6.0.0 (Sep. 2003), 3rd Generation Partnership Project; TechnicalSpecification Group Services and System Aspects; Technical Specification Group working methods (Release 5),total 33 pages.
ETSI TR 121 905 V.7.4.0 (Jun. 2007),Digital cellular telecommunications system (Phase 2+);Universal Mobile Telecommunications System (UMTS); Vocabulary for 3GPP Specifications (3GPP TR 21.905 version 7.4.0 Release 7), total 56 pages.
S3-070367 Nokia et al.,"Security Mode Command procedure update",3GPP TSG SA WG3 Security—S3#47,May 22-25, 2007,Tallinn. Estonia,total 12 pages.
S3a071040 Huawei et al.,"Key handling on idle mode mobility from UTRAN to E-UTRAN",3GPP TSG SA WG3 Security—SA3#49bis,Dec. 11-13, 2007,Sophia Antipolis, France,total 3 pages.

S3-070305 Nokia Siemens Networks et al.,"Key refresh procedure on idle-to-active and detached-to-active state transitions",3GPP TSG SA WG3 Security—SA3#47,Tallinn, Estonia, May 22-25, 2007,total 5 pages.
S3-070304 Nokia Siemens Networks et al.,"Key handling on idle mode mobility",3GPP TSG SA WG3 Security—SA3#47,Tallinn, Estonia, May 22-25, 2007,total 2 pages.
S3-070265 Gemalto, Oberthur,"Pseudo-CR to TR 33.821:alternative solution to derive user-related key in SAE/LTE",3GPP TSG SA WG3 Security—SA3#46b Ad-hoc meeting on SAE/LTE Mar. 28-29, 2007 Sophia-Antipolis, France,total 4 pages.
S3-070234 Nokia, Siemens Networks,"Key refresh in SAE/LTE",3GPP TSG SA WG3 Security—SA3#46 b,Sophia Antipolis, Mar. 28-29, 2007,total 6 pages.
S3-070100 Nokia, Siemens Networks,"Security algorithm negotiation in SAE/LTE networks",3GPP TSG SA WG3 Security—SA3#46,Beijing, China, Feb. 13-16, 2007,total 11 pages.
S3-070095 Nokia, Siemens Networks,"Hierarchy of user-related keys in SAE/LTE",3GPP TSG SA WG3 Security—SA3#46,Beijing, China, Feb. 13-16, 2007,total 8 pages.
S2-070819 Siemens Networks,"Identities used for inter CN node mobility",3GPP TSG SA WG2 Architecture—S2#56b Rel-8 Ad-hoc, Feb. 12-15, 2007,St Louis. Missouri. USA,total 5 pages.
S2-070655 Dave Fox et al.,TSG RAN WG2,"LS on SIM and USIM usage in LTE/SAE",3GPP TSG SA WG2 Architecture—S2#56b Rel-8 Ad-hoc,Feb. 12-15, 2007,St Louis, Missouri, USA,total 3 pages.
S2-061140 Samsung Electronics.,"Generic approach: Idle state mobility between 3GPP Access systems",3GPP TSG SA WG2 Architecture—S2#51,Feb. 13-17, 2006, Denver, Colorado, USA,total 4 pages.
S2-060568 Huawei,"Inter 3GPP Access System Mobility in Idle State",3GPP TSG SA WG2 Architecture—S2#50,Jan. 16-20, 2006,Budapest, Hungary,total 2 pages.
S2-060162 Lucent Technologies,"Discussion of Inter-system mobility in Idle",3GPP TSG SA WG2 Architecture #50,Jan. 16-20, 2006,Budapest, Hungary,total 4 pages.
S2-052888 Siemens,Comparison of Key Issues "Intra LTE-Access-System Mobility in LTE_IDLE State" and "Inter 3GPP Access System Mobility in Idle State",3GPP TSG SA WG2 #49,Yokosuka, Japan, Nov. 7-11, 2005, total 5 pages.
Yi-Bing Lin et al.,"Reducing Authentication signaling Traffic in Third-Generation Mobile Network",IEEE Transactions on Wireless Communications, vol. 2, No. 3, May 2003,total 9 pages.
LGW-070013 Siemens,"Non-realtime support for GERAN towards LTE handovers",3GPP Workshop on LTE-GSM Handovers,Sophia Antipolis, France, Jan. 10-11, 2007,total 4 pages.
3GPP TR 33.821 V8.0.0 (Mar. 2009),3rd Generation Partnership Project;Technical Specification Group Services and System Aspects+ Rationale and track of security decisions in Long Term Evolved (LTE) RAN / 3GPP System Architecture Evolution (SAE)(Release 8),total 137 pages.
3GPP TS 36.331 V8.1.0 (Mar. 2008),3rd Generation Partnership Project;Technical Specification Group Radio Access Network:Evolved Universal Terrestrial Radio Access (E-UTRA)Radio Resource Control (RRC);Protocol specification (Release 8),total 122 pages.
3GPP TS 36.331 V8.0.0 (Dec. 2007),3rd Generation Partnership Project;Technical Specification Group Radio Access Network;Evolved Universal Terrestrial Radio Access (E-UTRA)Radio Resource Control (RRC);Protocol specification (Release 8),total 56 pages.
3GPP TS 33.102 V7.1.0 (Feb. 2006),3rd Generation Partnership Project;Technical Specification Group Services and System Aspects; 3G Security; Security architectur* (Release 7),total 64 pages.
3GPP TS 33.401 V2.0.0 (May 2008),3rd Generation Partnership Project;Technical Specification Group Services and System Aspects;3GPP System Architecture Evolution (SAE): Security Architecture;(Release 8),total 45 pages.
3GPP TS 23.401 V1.0.0 (May 2007),3rd Generation Partnership Project;Technical Specification Group Services and System Aspects;GPRS enhancements for E-UTRAN acces▲ (Release 8),total 50 pages.
Ex. 1007—UMTS Mohsin Iftikhar et al., An Analytical model Based on G/M/1 with Self-Similar Input to Provide End-to-End QoS in 3G Networks, Mobile WAC '06 (Oct. 2006),total 10 pages.

(56) References Cited

OTHER PUBLICATIONS

Ex. 1010—NIST Jeffrey Cichonski et al.,"LTE Architecture Overview and Security Analysis",Draft NISTIR 8071, National Institute of Standards and Technology (2016),total 47 pages.
Ex. 1013—3G Evolution Erik Dahlman et al.,"3G Evolution, HSPA and LTE for Mobile Broadband", 2nd Ed. (2008),total 55 pages.
Ex. 1018—AKA History Stephanie Alt et al., A Cryptographic Analysis of UMTS/LTE AKA, Springer International Publishing (2016),total 19 pages.
Ex. 1019—Tang Tang et al.,"Analysis of Authentication and Key Establishment in Inter-Generational Mobile Telephony", Stevens Institute of Technology (2013),total 22 pages.
Ex. 1020—TA Overview Chris et al.,"LTE: Tracking Area (TA) and Tracking Area Update (TAU)",Netmanias Tech Blog (2013),total 3 pages.
Ex. 1021—Ericsson Test Bed Bernt Johansson and Tomas Sundin,"LTE Test Bed" (Ericsson ReviewNo. 1) (2007),total 6 pages.
Ex. 1022—TR 21.900 3GPP TR 21.900 V8.0.0 (Sep. 2007) 3rd Generation Partnership Project; Technical Specification Group Services and System Aspects;Technical Specification Group working methods (Release 8),available at http://www.3gpp.org/ftp/Specs/archive/21_series/21.900/21900-800.zip (last accessed May 23, 2017),total 34 pages.
Ex. 1023—R1-081711,"Final Report of 3GPP TSG RAN WG1 #52bis v1.0.0(Shenzhen, China, Mar. 31-Apr. 4, 2008)",3GPP TSG RAN WG1 Meeting #53,Kansas City, USA, May 5-9, 2008, available at http://www.3gpp.org/ftp/tsg_ran/WG1_RL1/TSGR1_53/Docs/R1-081711.zip (last accessed May 23, 2017),total 78 pages.
3GPP TR 33.821 V0.4.0 (Jul. 2007),3rd Generation Partnership Project;Technical Specification Group Services and System Aspects;Rationale and track of security decisions in Long Term Evolved(LTE) RAN / 3GPP System Architecture Evolution (SAE)(Release 8),total 95 pages.
3GPP TS 23.060 V7.4.0 (Mar. 2007),3rd Generation Partnership Project;Technical Specification Group Services and System Aspects;General Packet Radio Service (GPRS)+ Service description+ Stage 2 (Release 7),total 229 pages.
3GPP TS 23.401 V1.1.0 (Jul. 2007),3rd Generation Partnership Project;Technical Specification Group Services and System Aspects;GPRS enhancements for E-UTRAN access(Release 8) ,total 83 pages.
3GPP TS 23.401 V13.2.0 (Mar. 2015),3rd Generation Partnership Project;Technical Specification Group Services and System Aspects;General Packet Radio Service (GPRS) enhancements for Evolved Universal Terrestrial Radio Access Network (E-UTRAN)access(Release 13),total 331 pages.
3GPP TS 24.008 V7.8.0 (Jun. 2007),3rd Generation Partnership Project;Technical Specification Group Core Network and Terminals; Mobile radio interface Layer 3 specification;Core network protocols; Stage 3(Release 7),total 547 pages.
Rajavelsamy R et al.,"A Novel Method for Authentication Optimization during Handover in Heterogeneous Wireless Networks",IEEE,dated Jul. 9, 2007,total 5 pages.
A.R. Prasad et al.,"An Evolutionary Approach towards Ubiquitous Communication—A Security Perspective",IEEE,dated Mar. 3, 2004 ,total 7 pages.
Victor Y.H. Kueh et al.,"Application of Context Transfer for Roaming in IP-Based Evolved 3G Networks",IEEE,dated Dec. 11, 2006,total 5 pages.
Horster, Patrick (Ed.),"Communications and Multimedia Security II",dated Sep. 24, 1996,total 19 pages.
Steve Burneet et al.,"RSA Security's Official Guide to Cryptography",Osborne , 2004,total 44 pages.
S3-070232 Nokia et al.,"Pseudo-Change Request to TR 33.821: Update of sections 7.4.11 and 7.4.12 on active and idle mode mobility of user-related keys in SAE/LTE",,total 6 pages.
S2-071124 Huawei,"Attach signalling flows",3GPP TSG SA WG2 Architecture -S2#56c Rel-8 Ad-hoc,Mar. 26-30, 2007,Warsaw, Poland,total 5 pages.
S2-071399 Nokia et al.,"Tracking Area Update with CN Node Change",3GPP TSG SA WG2 Architecture—S2 Rel-8 Ad-hoc,Mar. 26-30, 2007,Warsaw, Poland,total 7 pages.
S3-070685 Huawei,"hey handling on idle mode mobility from UTRAN to E-UTRAN",3GPP TSG SA W G3 Security—S3#49,Oct. 8-12, 2007,Munich, Germany,total 2 pages.
3GPP TS 25.304 V3.14.0 (Mar. 2004), 3rd Generation Partnership Project;Technical Specification Group Radio Access Network; User Equipment (UE) procedures in idle mode and procedures for cell reselection in connected mode (Release 1999),total 41 pages.
3GPP TS 29.060 V8.0.0 (Jun. 2007), 3rd Generation Partnership Project;Technical Specification Group Core Network and Terminals;General Packet Radio Service (GPRS);GPRS Tunnelling Protocol (GTP)across the Gn and Gp interface (Release 8),total 150 pages.

* cited by examiner

COMMUNICATION METHOD AND DEVICE

CROSS-REFERENCE TO RELATED APPLICATIONS

This application is a continuation of U.S. patent application Ser. No. 15/372,093, filed on Dec. 7, 2016, now U.S. Pat. No. 10,015,669, which is a continuation of U.S. patent application Ser. No. 14/873,504, filed on Oct. 2, 2015, now U.S. Pat. No. 9,538,373, which is a continuation of U.S. patent application Ser. No. 14/303,146, filed on Jun. 12, 2014, now U.S. Pat. No. 9,241,261, which is a continuation of U.S. patent application Ser. No. 14/147,179, filed on Jan. 3, 2014, now U.S. Pat. No. 8,812,848, which is a continuation of U.S. patent application Ser. No. 12/633,948, filed on Dec. 9, 2009, now U.S. Pat. No. 8,656,169, which is a continuation of International Application No. PCT/CN2008/072165, filed on Aug. 27, 2008, which claims priorities of Chinese Patent Application No. 200710145703.3, filed on Aug. 31, 2007 and Chinese Patent Application No. 200710151700.0, filed on Sep. 26, 2007, all of which are hereby incorporated by reference in their entireties.

TECHNICAL FIELD

The present disclosure relates to the field of wireless communication technology, and more particularly to a communication method and device.

BACKGROUND

A wireless network includes a radio access network and a core network. A core network of a long term evolution (LTE) wireless network includes a mobility management entity (MME). The MME has functions similar to those of a service general packet radio service (GPRS) support node (SGSN) of a second/third generation (2G/3G) network, and is mainly responsible for mobility management and user authentication. When a user equipment (UE) is in an idle state in a 2G/3G or LTE wireless network, the UE needs to respectively negotiate a non-access stratum (NAS) security capability with the SGSN or the MME. The security capability includes an NAS signaling encryption algorithm, a corresponding NAS integrity protection key Knas-int, an NAS integrity protection algorithm, and a corresponding NAS confidentiality protection key Knas-enc, which are used for signaling transmission between the UE and a system, thereby ensuring the normal receiving of the UE signaling and the security of the communication system.

When the UE accessing a 2G global system for mobile communications (GSM) edge radio access network (GERAN) or a 3G universal mobile telecommunications system (UMTS) terrestrial radio access network (UTRAN) moves in the idle state, the UE may move to a tracking area of an LTE radio access network, and thus the UE may access the network again through the LTE. At this time, a tracking area update (TAU) procedure occurs, that is, a TAU procedure between heterogeneous networks occurs. During the procedure, since the entity performing security capability negotiation for the UE changes, for example, from the SGSN to the MME, and the entities may have different security capabilities, the security capability negotiation procedure needs to be performed again, so as to ensure the security of subsequent interaction between the UE and the network. It should be noted that, for the LTE network, the security capability negotiation includes negotiation of an NAS confidentiality protection algorithm and an NAS integrity protection algorithm, a radio resource control (RRC) confidentiality protection algorithm and an RRC integrity protection algorithm, and a user plane (UP) confidentiality protection algorithm.

For the TAU procedure initiated by the UE in the idle state, the negotiation of the NAS confidentiality protection algorithm, the NAS integrity protection algorithm, and the corresponding NAS protection keys need to be solved.

During the implementation of the present disclosure, the inventor found that, no method for negotiating the security capability during the TAU procedure between the heterogeneous networks can be found in the prior art, so that when the UE moves from the 2G/3G network to the LTE network, the security capability negotiation cannot be performed, resulting in that the security of subsequent interaction between the UE and the network cannot be ensured.

SUMMARY

In one embodiment of the present disclosure, a communication method is disclosed. This method includes receiving by a SGSN a context request message from an MME, obtaining by the SGSN an authentication vector-related key, and calculating by the SGSN a root key according to the authentication vector-related key. In addition, this method further includes sending, by the SGSN, a context response message including the root key to the MME, wherein the MME derives a NAS protection key according to the root key.

In another embodiment of the present disclosure, a SGSN is disclosed. This SGSN includes a receiver configured to receive a context request message from an MME, a processor configured to obtain an authentication vector-related key and calculate a root key according to the authentication vector-related key, and a transmitter configured to send a context response message including the root key to the MME.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

DETAILED DESCRIPTION

In a method for negotiating a security capability when a terminal moves provided in the embodiments of the present disclosure, when a UE moves from a 2G/3G network to an LTE network, an MME receives a TAU request message sent from the UE, and acquires an NAS security algorithm supported by the UE, and an authentication vector-related key or a root key derived according to the authentication vector-related key. Then, the MME selects an NAS security algorithm according to the NAS security algorithm supported by the UE, derives an NAS protection key according to the authentication vector-related key or the root key derived according to the authentication vector-related key, and sends a message carrying the selected NAS security algorithm to the UE. The UE derives an NAS protection key according to an authentication vector-related key.

The embodiments of the present disclosure are illustrated in detail below with reference to specific embodiments and the accompanying drawings.

It is assumed that a UE has accessed a UTRAN/GERAN when being in an idle state. In this case, when moving to a tracking area of an LTE network, the UE initiates a TAU procedure.

Figure 1:
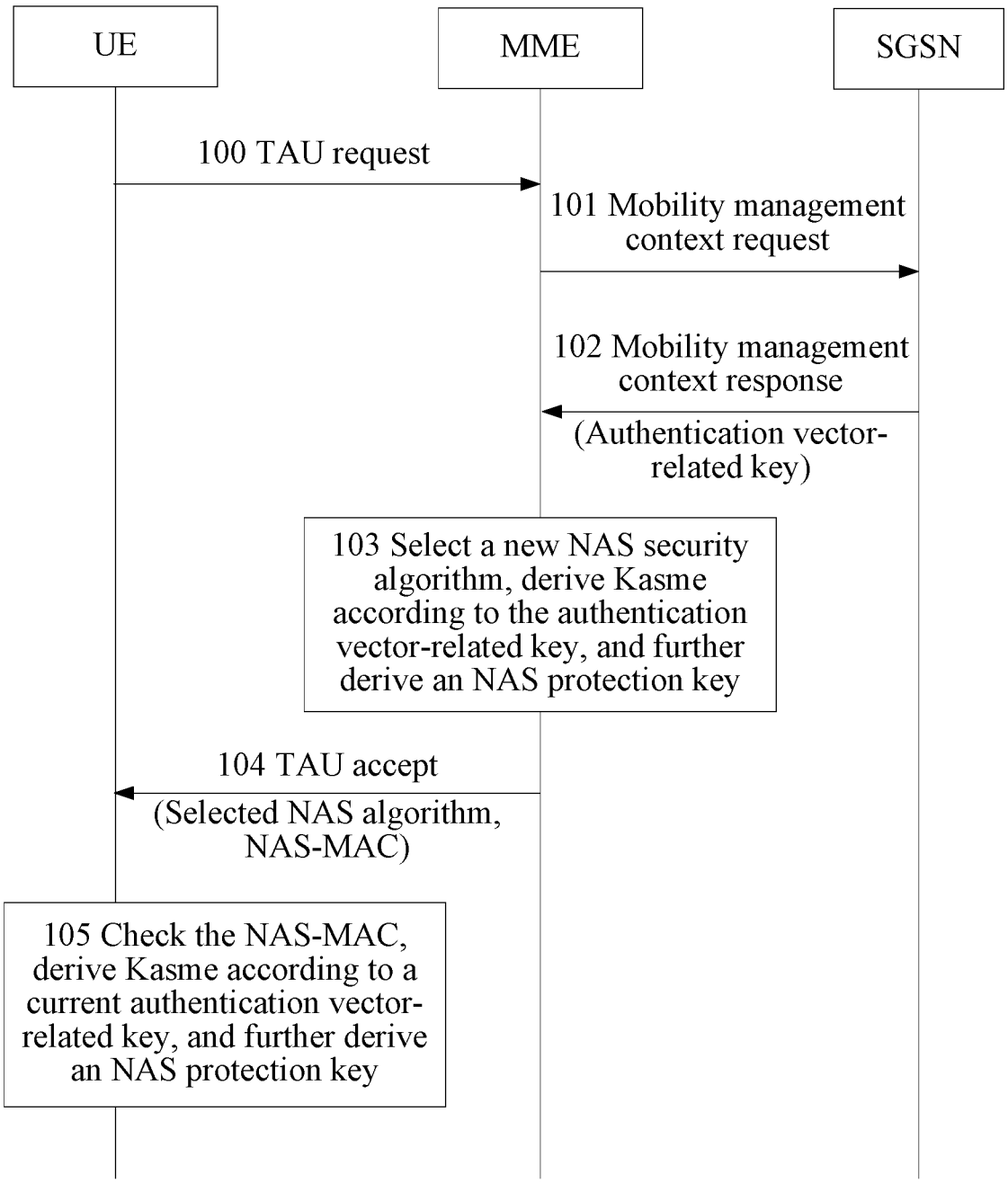
FIG. 1 is a flow chart of a method, according to a first embodiment of the present disclosure, for negotiating a security capability when a terminal moves.

FIG. 1 is a flow chart of a method, according to a first embodiment of the present disclosure, for negotiating a security capability when a terminal moves. Referring to FIG. 1, the method includes the following steps.

In step 100, a UE sends a TAU request to an MME.

In this step, the UE sends the TAU request to a new MME through an evolved Node B (eNB) of an LTE radio access network. For the convenience of description, communication between the UE and the MME through the eNB is simplified to communication between the UE and the MME in the following description.

The TAU request sent from the UE to the MME in this step not only carries some parameters such as a temporary mobile subscriber identity (TMSI) known to persons skilled in the art, but may also carry security capability information supported by the UE. The security capability information includes an NAS security algorithm (an NAS integrity protection algorithm and/or an NAS confidentiality protection algorithm), and may also include an RRC security algorithm (an RRC integrity protection algorithm and/or an RRC confidentiality protection algorithm) or a UP security algorithm (a UP confidentiality protection algorithm).

In steps 101-102, the MME acquires an NAS security algorithm supported by the UE, and sends a mobility management context request message to an SGSN. After receiving the message, the SGSN sends a mobility management context response message carrying an authentication vector-related key to the MME.

If in step 100, the UE does not carry the NAS security algorithm supported by the UE in the TAU request sent to the MME, after receiving the mobility management context request message, the SGSN queries the NAS security algorithm supported by the UE, and carries the queried NAS security algorithm supported by the UE in the mobility management context response message sent to the MME. The NAS security algorithm is the NAS integrity protection algorithm and/or the NAS confidentiality protection algorithm.

When the UE moves from the 2G network to the tracking area of the LTE network, the SGSN in the above process is an SGSN of the 2G network, and the authentication vector-related key at least includes an encryption key (Kc), or a value Kc' obtained after a unidirectional conversion is performed on the Kc. When the UE moves from the 3G network to the tracking area of the LTE network, the SGSN in the above process is an SGSN of the 3G network, and the authentication vector-related key at least includes an integrity key (IK) and an encryption key (CK), or values IK' and CK' after a unidirectional conversion is performed on the IK and the CK.

The unidirectional conversion refers to a conversion procedure in which an original parameter is converted using a certain algorithm to obtain a target parameter, but the original parameter cannot be derived according to the target parameter. For example, for the Kc, if the Kc' is obtained using an algorithm f(Kc), but the Kc cannot be derived according to the Kc' using any inverse algorithm, the conversion is the unidirectional conversion.

In step 103, the MME selects a new NAS security algorithm, according to the NAS security algorithm supported by the UE and an NAS security algorithm supported by the MME as well as an NAS security algorithm allowed by the system, derives a root key Kasme according to the authentication vector-related key, and then derives an NAS protection key according to the Kasme. The NAS protection key includes an NAS integrity protection key Knas-int and/or an NAS confidentiality protection key Knas-enc.

In step 104, the MME generates a TAU accept message carrying the selected NAS security algorithm.

In this step, the MME may further perform an NAS integrity protection on the TAU accept message. For example, the MME derives a value of a message authentication code of the NAS integrity protection (NAS-MAC) according to the NAS integrity protection key Knas-int derived in step 103, information in the TAU accept, and the NAS integrity protection algorithm in the selected NAS security algorithm, and then carries the value in the TAU accept message, and sends the TAU accept message to the UE.

The TAU accept message in this step may further carry security capability information supported by the UE.

In step 105, the UE receives the TAU accept message carrying the NAS security algorithm selected by the MME, and acquires the negotiated NAS security algorithm; and then derives a root key Kasme according to a current authentication vector-related key thereof (for example, the IK and the CK, or the IK' and the CK' derived according to the IK and the CK when the originating network is the 3G, or the Kc or the Kc' derived according to the Kc when the originating network is the 2G), and derives an NAS protection key according to the root key. The NAS protection key includes the NAS integrity protection key Knas-int and/or the NAS confidentiality protection key Knas-enc.

In this step, the UE may further detect whether the integrity protection performed on the TAU accept message is correct. If not, it is determined that the current security capability negotiation fails, and the security capability negotiation procedure may be initiated again. For example, the UE derives an NAS-MAC according to the derived NAS confidentiality protection key Knas-enc, the information in the TAU accept, and the NAS integrity protection algorithm carried in the TAU accept message, and then compares whether the derived NAS-MAC is the same as the NAS-MAC carried in the TAU accept message. If yes, it indicates that the message is not modified during transmission; otherwise, it is deemed that the message is modified during transmission, and it is thus determined that the current security capability negotiation fails.

If in step 104, the TAU accept message further carries the security capability information supported by the UE, in this step, the UE may further compare the security capability information supported by the UE and carried in the TAU accept message with security capability information stored therein. If the two are consistent with each other, it is determined that no degradation attack occurs; otherwise, it is determined that a degradation attack occurs, and that the current security capability negotiation fails, and the security capability negotiation procedure may be initiated again, thereby preventing the degradation attack.

For the degradation attack, it is assumed that the UE supports two security algorithms at the same time, namely, a high strength algorithm A1 and a low strength algorithm A2, and the MME also supports the two algorithms. In this manner, the high strength algorithm A1 should be negotiated between the UE and the MME. However, if in a path along which the UE sends the security capability information supported by the UE to the MME, an attacker modifies the security capability information of the UE, for example, only the low strength algorithm A2 is maintained, or when the MME selects the NAS security algorithm, the security capability information supported by the UE is modified by the attacker, and only the low strength algorithm A2 is maintained, the MME can only select and send the low strength algorithm A2 to the UE. That is, the low strength algorithm A2, rather than the high strength algorithm A1, is obtained through the negotiation between the UE and the MME, so that the attacker may perform an attack more easily, which is the so-called degradation attack. In an embodiment of the present disclosure, the MME sends the security capability information supported by the UE to the UE, and the UE detects whether the security capability information supported by the UE is consistent with the security capability information supported by the UE, thereby detecting and further preventing the degradation attack.

The procedure that the MME finally derives the NAS protection key according to the authentication vector-related key in step 103 is not limited to any time sequence with respect to step 104 and step 105, and the procedure may be performed before step 104, or between step 104 and step 105, or after step 105.

In the above process, the MME and the UE may also directly derive the NAS protection key according to the authentication vector-related key without deriving the root key and then deriving the NAS protection key according to the root key.

It should be understood by persons skilled in the art that, in the above process, a derivation method used by the UE to derive the NAS protection key according to the authentication vector-related key must be the same as that used by the network side to derive the NAS protection key according to the authentication vector-related key. The derivation method may adopt any unidirectional conversion, for example, Kasme=f(IK, CK, other parameters), Knas-enc=f(Kasme, NAS confidentiality protection algorithm, other parameters), and Knas-int=f(Kasme, NAS integrity protection algorithm, other parameters).

In addition, in order to highlight this embodiment of the present disclosure, procedures that are not related to the security are omitted between steps 102 and 104 in the above process.

Through the above process, the UE and the MME can share the NAS security algorithm and the NAS protection key, thereby implementing the negotiation of the NAS security capability.

Figure 2:
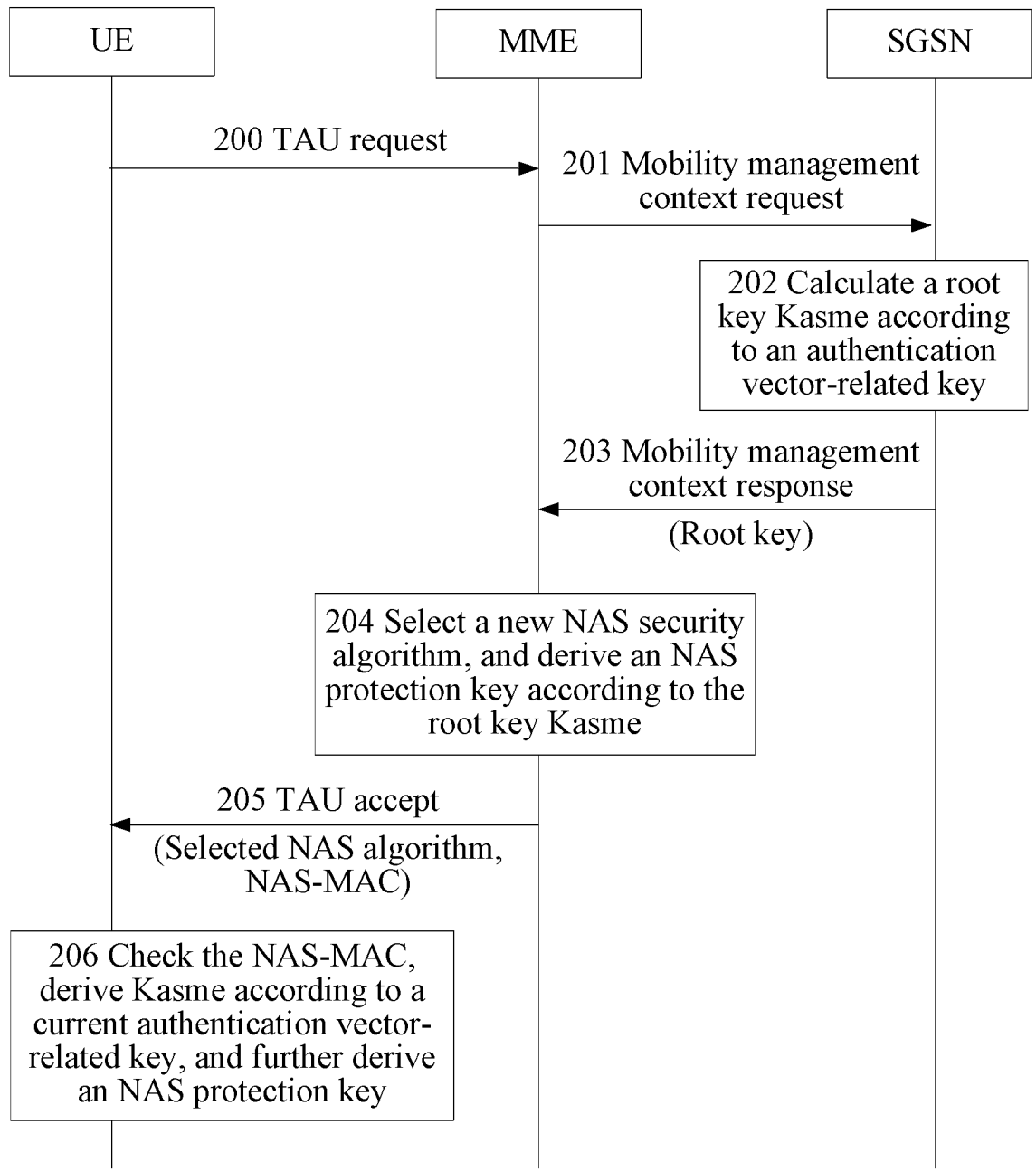
FIG. 2 is a flow chart of a method, according to a second embodiment of the present disclosure, for negotiating a security capability when a terminal moves.

FIG. 2 is a flow chart of a method, according to a second embodiment of the present disclosure, for negotiating a security capability when a terminal moves. Referring to FIG. 2, the method includes the following steps.

Step 200 is the same as step 100, so description thereof is omitted here.

In steps 201-203, the MME acquires an NAS security algorithm supported by the UE, and sends a context request message to an SGSN. After receiving the context request message, the SGSN derives a root key according to an authentication vector-related key thereof, and then sends a context response message carrying the root key to the MME.

In other embodiments of the present disclosure, if in step 200, the UE does not carry the NAS security algorithm supported by the UE in the TAU request sent to the MME, after receiving the mobility management context request message, the SGSN queries the NAS security algorithm supported by the UE, and carries the queried NAS security algorithm supported by the UE in the mobility management context response message sent to the MME. The NAS security algorithm is the NAS integrity protection algorithm and/or the NAS confidentiality protection algorithm.

When the UE moves from the 2G network to the tracking area of the LTE network, the SGSN in the above process is an SGSN of the 2G network, and the root key is the root key Kasme derived by the SGSN according to the Kc or the Kc' obtained after the unidirectional conversion is performed on the Kc. When the UE moves from the 3G network to the tracking area of the LTE network, the SGSN in the above process is an SGSN of the 3G network, and the root key is the Kasme derived by the SGSN according to the IK and the CK, or the IK' and the CK' after the unidirectional conversion is performed on the IK and the CK.

In step 204, the MME selects a new NAS security algorithm, according to the NAS security algorithm supported by the UE and an NAS security algorithm supported by the MME as well as an NAS security algorithm allowed by the system; and then derives an NAS protection key according to the root key. The NAS protection key includes an NAS integrity protection key Knas-int and/or an NAS confidentiality protection key Knas-enc.

In step 205, the MME generates a TAU accept message carrying the selected NAS security algorithm.

In this step, the MME may further perform an NAS integrity protection on the TAU accept message. The TAU accept message in this step may further carry security capability information supported by the UE.

In step 206, the UE receives the TAU accept message carrying the NAS security algorithm selected by the MME, and acquires the negotiated NAS security algorithm; and then derives a root key Kasme according to a current authentication vector-related key (for example, the IK and the CK, or the IK' and the CK' derived according to the IK and the CK when the originating network is the 3G, or the Kc or the Kc' derived according to the Kc when the originating network is the 2G), and derives an NAS protection key according to the root key. The NAS protection key includes the NAS integrity protection key Knas-int and/or the NAS confidentiality protection key Knas-enc.

In this step, the UE may further detect whether the integrity protection performed on the TAU accept message is correct. If not, it is determined that the current security capability negotiation fails, and the security capability negotiation procedure may be initiated again.

In other embodiments of the present disclosure, if in step 205, the TAU accept message further carries the security capability information supported by the UE, in this step, the UE may further compare the security capability information supported by the UE carried in the TAU accept message with security capability information supported by the UE. If the two are consistent with each other, it is determined that no degradation attack occurs; otherwise, it is determined that a degradation attack occurs, and that the current security capability negotiation fails, and the security capability negotiation procedure may be initiated again, thereby preventing the degradation attack.

In other embodiments of the present disclosure, the procedure that the MME derives the NAS protection key according to the root key in step 204 is not limited to any time sequence with respect to step 205 and step 206, and the procedure may be performed before step 205, or between step 205 and step 206, or after step 206.

It should be understood by persons skilled in the art that, in the above process, a derivation method used by the UE to derive the NAS protection key according to the authentication vector-related key must be the same as that used by the network side to derive the NAS protection key according to the authentication vector-related key.

Through the above process, the UE and the MME can share the NAS security algorithm and the NAS protection key, thereby implementing the negotiation of the NAS security capability.

Figure 3:
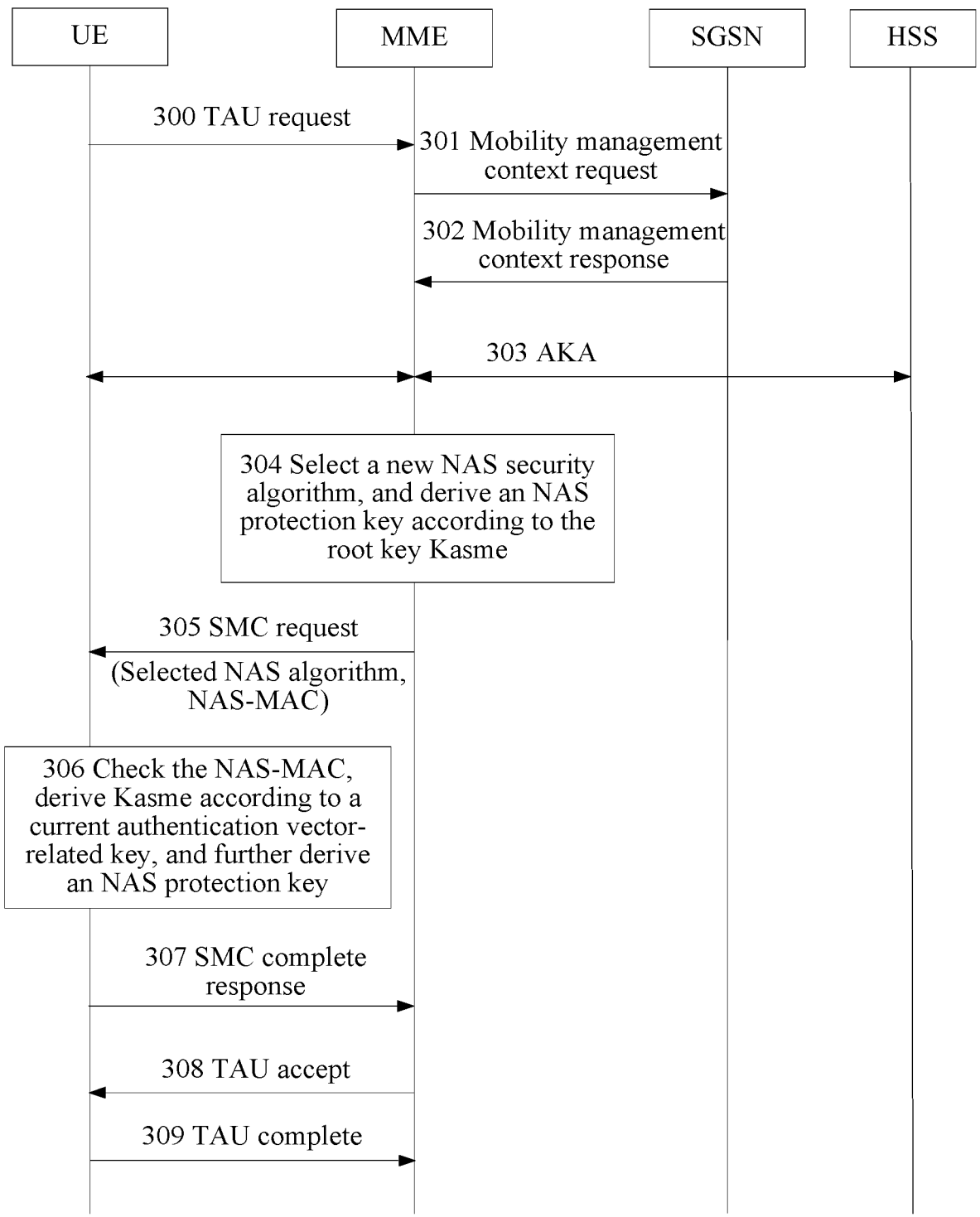
FIG. 3 is a flow chart of a method, according to a third embodiment of the present disclosure, for negotiating a security capability when a terminal moves.

FIG. 3 is a flow chart of a method, according to a third embodiment of the present disclosure, for negotiating a security capability when a terminal moves. Referring to FIG. 3, the method includes the following steps.

Step 300 is the same as step 100, so description thereof is omitted here.

In steps 301-302, the MME acquires an NAS security algorithm supported by the UE from an SGSN through mobility management context request and response messages.

In other embodiments of the present disclosure, if in step 300, the UE does not carry the NAS security algorithm supported by the UE in the TAU request sent to the MME, after receiving the mobility management context request message, the SGSN queries the NAS security algorithm supported by the UE, and carries the queried NAS security algorithm supported by the UE in the mobility management context response message sent to the MME. The NAS security algorithm is the NAS integrity protection algorithm and/or the NAS confidentiality protection algorithm.

In step 303, the MME acquires a root key Kasme derived according to an authentication vector-related key from a home subscriber server (HS S) through an authentication and key agreement (AKA) procedure.

In step 304, the MME selects a new NAS security algorithm, according to the NAS security algorithm supported by the UE and an NAS security algorithm supported by the MME as well as and an NAS security algorithm allowed by the system; and then derives other NAS protection keys according to the Kasme. The NAS protection keys include an NAS integrity protection key Knas-int and an NAS confidentiality protection key Knas-enc.

In step 305, the MME generates and sends to the UE an NAS security mode command (SMC) request message carrying the selected NAS security algorithm. The SMC request message may be carried in a TAU accept message.

In this step, the MME may further perform an NAS integrity protection on the SMC accept message. For example, the MME derives a value of an NAS-MAC according to the NAS integrity protection key Knas-int derived in step 304, information in the SMC request message, and the NAS integrity protection algorithm in the selected NAS security algorithm, and then carries the value in the SMC request message, and sends the SMC request message to the UE.

The SMC request message in this step may further carry security capability information supported by the UE.

In step 306, the UE receives the SMC request message carrying the NAS security algorithm selected by the MME, and acquires the NAS security algorithm supported by the UE and selected by the MME; and then derives a root key according to a current authentication vector-related key obtained in an AKA procedure thereof, and derives an NAS protection key according to the root key. The NAS protection key includes the NAS integrity protection key Knas-int and the NAS confidentiality protection key Knas-enc.

In this embodiment, in this step, the UE may further detect whether the integrity protection performed on the TAU accept message is correct. If not, it is determined that the current security capability negotiation fails, and the security capability negotiation procedure may be initiated again. For example, the UE derives an NAS-MAC according to the derived NAS confidentiality protection key Knas-enc, the information in the TAU accept message, and the NAS integrity protection algorithm carried in the TAU accept message, and then compares whether the derived NAS-MAC is the same as the NAS-MAC carried in the TAU accept message. If yes, it indicates that the message is not modified during transmission; otherwise, it is deemed that the message is modified during transmission, and it is thus determined that the current security capability negotiation fails.

In other embodiments of the present disclosure, if in step 305, the SMC request message further carries the security capability information supported by the UE, in this step, the UE may further compare the security capability information supported by the UE and carried in the SMC request message with security capability information supported by the UE. If the two are consistent with each other, it is determined that no degradation attack occurs; otherwise, it is determined that a degradation attack occurs, and that the current security capability negotiation fails, and the security capability negotiation procedure may be initiated again, thereby preventing the degradation attack.

In step 307, the UE sends an SMC complete response message to the MME. The SMC complete response message may be carried in a TAU complete message.

In step 308, the MME returns a TAU accept message.

In other embodiments of the present disclosure, when the SMC request message is sent to the UE by carrying the SMC request message in the TAU accept message in step 305, step 308 is combined with step 305.

In step 309, the UE returns a TAU complete message.

In other embodiments of the present disclosure, when the SMC complete response message is carried in the TAU complete message in step 307, step 309 is combined with step 307.

Through the above process, the negotiation of the NAS security capability is implemented.

Persons of ordinary skill in the art should understand that all or a part of the steps in the method according to the embodiments of the present disclosure may be implemented by a program instructing relevant hardware, and the program may be stored in a computer readable storage medium, such as a read-only memory (ROM)/random access memory (RAM), a magnetic disk, or an optical disk.

Figure 4:
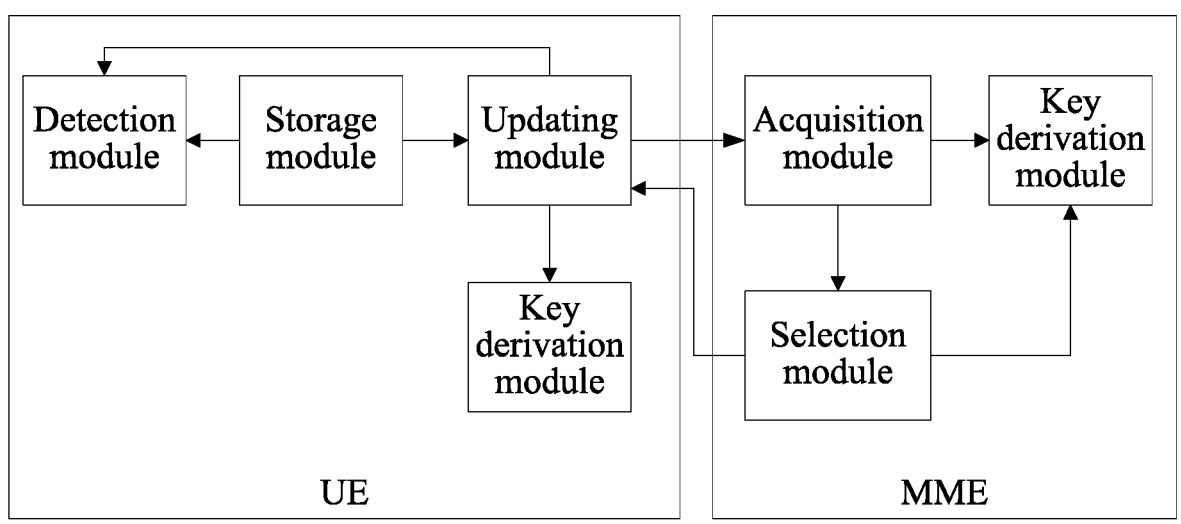
FIG. 4 is a structural view of a system, according to an embodiment of the present disclosure, for negotiating a security capability when a terminal moves.

FIG. 4 is a structural view of a system, according to an embodiment of the present disclosure, for negotiating a security capability when a terminal moves. Referring to FIG. 4, the system includes a UE and an MME.

The UE is adapted to send a TAU request message to the MME, receive a message carrying a selected NAS security algorithm sent from the MME, and derive an NAS protection key according to an authentication vector-related key.

The MME is adapted to receive the TAU request message sent from the UE; acquire an authentication vector-related key or a root key derived according to the authentication vector-related key, and an NAS security algorithm supported by the UE; select an NAS security algorithm according to the NAS security algorithm supported by the UE, and generate and send a message carrying the selected NAS security algorithm to the UE; and derive an NAS protection key according to the acquired authentication vector-related key or the root key derived according to the authentication vector-related key.

In the system, the MME further acquires security capability information supported by the UE, and further carries the security capability information supported by the UE in the message carrying the selected NAS security algorithm sent to the UE, and the UE further determines whether a degradation attack occurs by determining whether the security capability information supported by the UE and sent from the MME is consistent with security capability information supported by the UE.

The MME includes an acquisition module, a selection module, and a key derivation module.

The acquisition module is adapted to receive the TAU request message sent from the UE, acquire the authentication vector-related key or the root key derived according to the authentication vector-related key, and the NAS security algorithm supported by the UE. The selection module is adapted to select the NAS security algorithm according to the NAS security algorithm supported by the UE and acquired by the acquisition module, generate and send the message carrying the selected NAS security algorithm to the UE. The key derivation module is adapted to derive the NAS protection key, according to the authentication vector-related key or the root key derived according to the authentication vector-related key acquired by the acquisition module, and the selected NAS security algorithm.

The acquisition module further acquires the security capability information supported by the UE, and the selection module further carries the security capability information supported by the UE and acquired by the acquisition module in the message carrying the selected NAS security algorithm.

The UE includes an updating module, a key derivation module, a storage module, and a detection module.

The updating module is adapted to send the TAU request message carrying the security capability information supported by the UE and stored in the storage module to the MME, and receive the message carrying the selected NAS security algorithm sent from the MME. The key derivation module is adapted to derive the NAS protection key according to the authentication vector-related key and the selected NAS security algorithm received by the updating module. The storage module is adapted to store the security capability information supported by the UE. The detection module is adapted to determine that a degradation attack occurs when detecting that the security capability information supported by the UE and received from the MME is inconsistent with the security capability information supported by the UE and stored in the storage module. The message carrying the selected NAS security algorithm sent from the MME further carries security capability information supported by the UE.

It can be seen from the above description that, in the technical solutions provided in embodiments of the present disclosure, the MME receives the TAU request message sent from the UE, and acquires the NAS security algorithm supported by the UE and the authentication vector-related key or the root key derived according to the authentication vector-related key; and then selects the NAS security algorithm according to the NAS security algorithm supported by the UE, and generates and sends the message carrying the selected NAS security algorithm to the UE, thereby enabling the UE and the MME to share the NAS security algorithm. In addition, the UE and the MME derive the NAS protection key according to the authentication vector-related key or the root key derived according to the authentication vector-related key, thereby enabling the MME and the UE to share the NAS protection key. In this way, when moving from the 2G/3G network to the LTE network, the UE can negotiate the NAS security algorithm and the NAS protection key with the MME, so that the security capability negotiation process in the TAU procedure between the heterogeneous networks is achieved, thereby ensuring the security of subsequent interaction between the UE and the network.

Through the present disclosure, the degradation attack can be further prevented. The MME also returns the security capability information supported by the UE through the TAU accept message, and the UE detects whether the security capability information supported by the UE is consistent with the current security capability information supported by the UE. If yes, the current security capability negotiation succeeds, and the NAS security algorithm and the NAS protection key obtained through the negotiation can be used. If not, it is determined that a degradation attack occurs, the current security capability negotiation fails, and the security capability negotiation needs to be performed again. Through the above solutions, it can be detected whether the security capability information supported by the UE is attacked before the MME acquires the security capability information supported by the UE, thereby preventing the degradation attack and ensuring the security of subsequent interaction between the UE and the network.

In one embodiment, the present disclosure is directed to a method for negotiating a security capability when a terminal moves, so that when moving from a 2G/3G network to an LTE network, a UE in an idle state can negotiate a security capability.

In another embodiment, the present disclosure is further directed to a system for negotiating a security capability when a terminal moves, so that when moving from a 2G/3G network to an LTE network, a UE in an idle state can negotiate a security capability.

In yet another embodiment, the present disclosure is further directed to an MME, so that when moving from a 2G/3G network to an LTE network, a UE in an idle state can negotiate a security capability.

In yet another embodiment, the present disclosure is further directed to a UE device, so that when moving from a 2G/3G network to an LTE network, a UE in an idle state can negotiate a security capability.

In yet another embodiment, a method for negotiating a security capability when a terminal moves is provided, which includes the following steps. An MME receives a TAU request message sent from a UE, and acquires an NAS security algorithm supported by the UE, and an authentication vector-related key or a root key derived according to the authentication vector-related key. The MME selects an NAS security algorithm according to the NAS security algorithm supported by the UE, derives an NAS protection key according to the authentication vector-related key or the root key, and sends a message carrying the selected NAS security algorithm to the UE. The UE derives an NAS protection key according to an authentication vector-related key thereof.

In yet another embodiment, a system for negotiating a security capability when a terminal moves is provided, which includes a UE and an MME. The UE is configured to send a TAU request message to the MME, receive a message carrying a selected NAS security algorithm sent from the MME, and derive an NAS protection key according to an authentication vector-related key. The MME is configured to receive the TAU request message sent from the UE; acquire an authentication vector-related key or a root key derived according to the authentication vector-related key, and an NAS security algorithm supported by the UE; select an NAS security algorithm according to the NAS security algorithm supported by the UE, and generate and send a message carrying the selected NAS security algorithm to the UE; and derive an NAS protection key according to the acquired authentication vector-related key or the root key.

In yet another embodiment, an MME is provided, which includes an acquisition module, a selection module, and a key derivation module. The acquisition module is configured to receive a TAU request message sent from a UE, acquire an authentication vector-related key or a root key derived according to the authentication vector-related key, and an NAS security algorithm supported by the UE. The selection module is configured to select an NAS security algorithm according to the NAS security algorithm supported by the UE and acquired by the acquisition module, generate a message carrying the selected NAS security algorithm, and send the message to the UE. The key derivation module is configured to derive an NAS protection key according to the authentication vector-related key or the root key derived according to the authentication vector-related key acquired by the acquisition module, and the NAS security algorithm selected by the selection module.

In yet another embodiment, a UE is provided, which includes an updating module, a key derivation module, a storage module, and a detection module. The updating module is configured to send to an MME a TAU request message carrying security capability information supported by the UE and stored in the storage module, and receive a message carrying a selected NAS security algorithm sent from the MME. The key derivation module is configured to derive an NAS protection key according to an authentication vector-related key and the NAS security algorithm received by the updating module. The storage module is configured to store the security capability information supported by the UE. The detection module is configured to determine that a degradation attack occurs when detecting that security capability information supported by the UE and received from the MME is inconsistent with the security capability information supported by the UE and stored in the storage module.

In yet another embodiment, the MME receives the TAU request message sent from the UE, and acquires the authentication vector-related key or the root key derived according to the authentication vector-related key and the NAS security algorithm supported by the UE; then selects the NAS security algorithm according to the NAS security algorithm supported by the UE, generates a message carrying the selected NAS security algorithm, and sends the message to the UE, thereby enabling the UE and the MME to share the NAS security algorithm. In addition, the MME derives the NAS protection key according to the authentication vector-related key or the root key derived according to the authentication vector-related key, and the UE derives the NAS protection key according to the authentication vector-related key, thereby enabling the MME and the UE to share the NAS protection key. In this way, when moving from the 2G/3G network to the LTE network, the UE can negotiate the NAS security algorithm and the NAS protection key with the MME, so that the security capability negotiation process in the TAU procedure between heterogeneous networks is achieved, thereby ensuring the security of subsequent interaction between the UE and the network.

In addition, the present disclosure is also applicable to a security capability negotiation procedure when the UE moves within the LTE network.

The above descriptions are merely preferred embodiments of the present disclosure, but not intended to limit the protection scope of the present disclosure. Any modification, equivalent replacement, and improvement made without departing from the spirit and principle of the present disclosure fall within the protection scope of the present disclosure.

What is claimed is:

1. A mobility management entity (MME) performing security negotiation for idle state mobility of a user equipment (UE) from a third generation (3G) network to a long term evolution (LTE) network, comprising:
a receiver configured to receive from the UE security capabilities of the UE including non-access stratum (NAS) security capabilities of the UE, and receive an authentication vector-related key from a service general packet radio service (GPRS) support node (SGSN) in the 3G network;
a processor configured to derive a root key with the authentication vector-related key, select a NAS security algorithm supported by the NAS security capabilities of the UE, and derive a NAS protection key with the selected NAS security algorithm and the root key; and
a transmitter configured to send a message that indicates the selected NAS security algorithm to the UE.

2. The MME of claim 1, wherein the receiver is configured to receive the NAS security capabilities of the UE through a tracking area update (TAU) request message.

3. The MME of claim 1, wherein the message that indicates the selected NAS security algorithm is a NAS security mode command message.

4. The MME of claim 1, wherein the message that indicates the selected NAS security algorithm is a tracking area update (TAU) accept message.

5. The MME of claim 1, wherein the processor is further configured to protect the message that indicates the selected NAS security algorithm with the derived NAS protection key.

6. The MME of claim 1, wherein the authentication vector-related key includes an integrity key (IK) and an encryption key (CK).

7. The MME of claim 2, wherein the message that indicates the selected NAS security algorithm is a NAS security mode command message.

8. The MME of claim 7, wherein the receiver is configured to receive the authentication vector-related key through a context response message.

9. The MME of claim 8, wherein the processor is further configured to protect the message that indicates the selected NAS security algorithm with the derived NAS protection key.

10. The MME of claim 9, wherein the authentication vector-related key includes an integrity key (IK) and an encryption key (CK).

11. A communications system that provides security negotiation for idle state mobility of a user equipment (UE) from a third generation (3G) network to a long term evolution (LTE) network, the system comprising: a service general packet radio service (GPRS) support node (SGSN) in the 3G network and a mobility management entity (MME) in the LTE network, wherein
the SGSN is configured to send an authentication vector-related key to the MME; and
the MME is configured to receive security capabilities of the UE including non-access stratum (NAS) security capabilities of the UE from the UE, derive a root key with the authentication vector-related key, select a NAS security algorithm supported by the NAS security capabilities of the UE, send a message that indicates the selected NAS security algorithm to the UE, and derive a NAS protection key with the selected NAS security algorithm and the root key.

12. The system of claim 11, wherein the MME is configured to receive the NAS security capabilities of the UE in a tracking area update (TAU) request message.

13. The system of claim 11, wherein the message that indicates the selected NAS security algorithm is one of a NAS security mode command message and a tracking area update (TAU) accept message.

14. The system of claim 11, wherein the MME is further configured to protect the message that indicates the selected NAS security algorithm with the derived NAS protection key.

15. The system of claim 11, wherein the authentication vector-related key includes an integrity key (IK) and an encryption key (CK).

16. The system of claim 11, wherein the SGSN is configured to send the authentication vector-related key through a context response message.

17. The system of claim 12, wherein the message that indicates the selected NAS security algorithm is a NAS security mode command message.

18. The system of claim 17, wherein the SGSN is configured to send the authentication vector-related key through a context response message.

19. The system of claim 18, wherein the MME is further configured to protect the message that indicates the selected NAS security algorithm with the derived NAS protection key.

20. The system of claim 19, wherein the authentication vector-related key includes an integrity key (IK) and an encryption key (CK).

* * * * *